United States Patent
Maruyama et al.

(10) Patent No.: US 10,857,713 B2
(45) Date of Patent: Dec. 8, 2020

(54) DISPLAY UNIT OF INJECTION MOLDING MACHINE AND DISPLAY UNIT DISPLAY METHOD

(71) Applicant: FANUC CORPORATION, Yamanashi (JP)

(72) Inventors: Junpei Maruyama, Yamanashi-ken (JP); Kazuyoshi Tanaka, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 219 days.

(21) Appl. No.: 16/163,025

(22) Filed: Oct. 17, 2018

(65) Prior Publication Data

US 2019/0118445 A1   Apr. 25, 2019

(30) Foreign Application Priority Data

Oct. 23, 2017   (JP) .................................. 2017-204408

(51) Int. Cl.
 *B29C 45/76*   (2006.01)
 *B29C 45/64*   (2006.01)
(52) U.S. Cl.
 CPC ............ *B29C 45/762* (2013.01); *B29C 45/64* (2013.01); *B29C 45/766* (2013.01); *B29C 45/76* (2013.01);
 (Continued)
(58) Field of Classification Search
 CPC .................. B29C 45/64; B29C 45/762; B29C 2945/76866; B29C 2945/76872; B29C 45/7606; B29C 45/766
 See application file for complete search history.

(56) References Cited

U.S. PATENT DOCUMENTS

| 5,539,650 A * | 7/1996 | Hehl ..................... B29C 45/766 |
| | | 264/40.1 |
| 6,512,528 B1 * | 1/2003 | Yamamoto ........... G05B 19/409 |
| | | 700/200 |

(Continued)

FOREIGN PATENT DOCUMENTS

| CN | 1853904 A | 11/2006 |
| CN | 102225609 A | 10/2011 |

(Continued)

OTHER PUBLICATIONS

Notice of Reasons for Refusal issued by the Japanese Patent Office in relation to Japanese Application No. 2017-204408 dated May 28, 2019 (3 pages) along with English language translation (3 pages).

(Continued)

*Primary Examiner* — Jennifer L Norton
(74) *Attorney, Agent, or Firm* — Robert P. Michal, Esq.; Carter, DeLuca & Farrell LLP

(57) ABSTRACT

A display unit of an injection molding machine that displays an order of operations of elements operating during clamp close or open of the injection molding machine, the display unit including a condition setting unit that sets a start condition of the operation; a group setting unit that sets the elements operating in conjunction with each other to be associated with the same group, based on the set start conditions; an order setting unit that sets the order of the operations of the elements associated with the same group, based on the set start conditions; and a display control unit that controls a display unit to display a field showing the group, and to display symbols indicating the operations of the elements associated with the groups in the fields, to show a before and after relationship in accordance with the set order of the operations.

15 Claims, 10 Drawing Sheets

(52) U.S. Cl.
CPC ............... *B29C 2045/7606* (2013.01); *B29C 2945/76866* (2013.01); *B29C 2945/76872* (2013.01); *G05B 2219/13144* (2013.01)

(56) References Cited

U.S. PATENT DOCUMENTS

| | | | |
|---|---|---|---|
| 8,688,260 B2* | 4/2014 | Stummer | G05B 19/0426 700/200 |
| 10,553,183 B2* | 2/2020 | Horiuchi | G06F 3/023 |
| 2004/0262799 A1* | 12/2004 | Wang | B29C 45/766 264/40.1 |
| 2006/0241805 A1* | 10/2006 | Katsuta | B29C 45/76 700/204 |
| 2008/0031992 A1 | 2/2008 | Matsuo et al. | |
| 2015/0331399 A1* | 11/2015 | Hackl | G06F 3/0488 700/83 |

FOREIGN PATENT DOCUMENTS

| | | | | |
|---|---|---|---|---|
| DE | 102006017496 A1 | 11/2006 | | |
| EP | 1887448 A1 | 2/2008 | | |
| JP | S59175461 U | 11/1984 | | |
| JP | S61248721 A | 11/1986 | | |
| JP | 05-050479 A | 3/1993 | | |
| JP | 2007-098810 A | 4/2007 | | |
| JP | 2007098810 A | 4/2007 | | |
| JP | 2008-036976 A | 2/2008 | | |
| WO | WO-2008061910 A2 * | 5/2008 | ........... | B29C 45/762 |
| WO | 2012002374 A1 | 1/2012 | | |
| WO | WO-2019078147 A1 * | 4/2019 | ............. | B29C 45/76 |

OTHER PUBLICATIONS

Written Opinion issued by the Japanese Patent Office in relation to Japanese Application No. 2017-204408 dated Jul. 11, 2019 (2 pages) along with English language translation (2 pages).

Decision to Grant a Patent issued by the Japanese Patent Office in relation to Japanese Application No. 2017-204408 dated Oct. 1, 2019 (3 pages) along with English language translation (2 pages).

German Office Action dated Jun. 29, 2020, issued in German Application No. 10 2018 126 015, 4 pages.

* cited by examiner

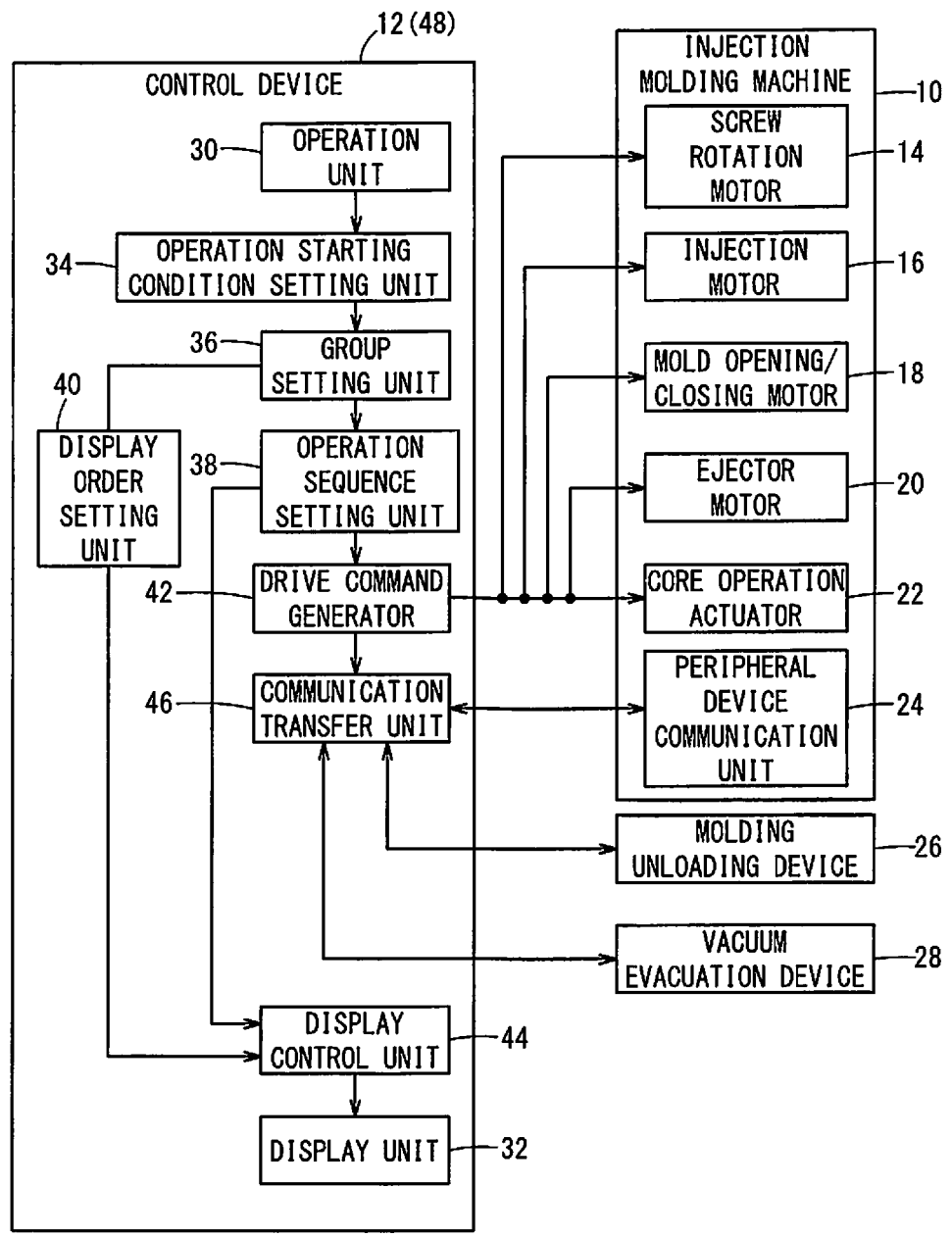

DISPLAY UNIT OF INJECTION MOLDING MACHINE AND DISPLAY UNIT DISPLAY METHOD

CROSS-REFERENCE TO RELATED APPLICATION

This application is based upon and claims the benefit of priority from Japanese Patent Application No. 2017-204408 filed on Oct. 23, 2017, the contents of which are incorporated herein by reference.

BACKGROUND OF THE INVENTION

Field of the Invention

The present invention relates to a display unit of an injection molding machine that displays the order of operations of a plurality of elements operating during the clamp close or open of the molds of the injection molding machine, and to a display method of the display device.

Description of the Related Art

Japanese Laid-Open Patent Publication No. 05-050479 discloses a device that displays the timings at which a plurality of cores operate, in time series.

SUMMARY OF THE INVENTION

In order to prevent damage or the like of a mold when a plurality of elements operate during the closing or opening of the mold, it is necessary for each element to operate in a suitable order. In the art of Japanese Laid-Open Patent Publication No. 05-050479, the timings at which a plurality of cores operate are displayed in time series, but it is difficult to understand the operational relationship between cores that must operate in a suitable order, and it is also difficult for an operator to check that the operations of the cores are set in a suitable order.

It is an object of the present invention to solve these problems and provide a display unit of an injection molding machine and a display method of the display unit that enable an operator to easily check whether the operations of a plurality of elements are suitably set.

A first aspect of the present invention is a display unit of an injection molding machine that displays an order of operations of a plurality of elements operating during clamp close or open of the injection molding machine, the display unit comprising an operation start condition setting unit that sets a start condition of the operation for each element; a group setting unit that sets the elements operating in conjunction with each other among the plurality of elements to be associated with the same group, based on the set start conditions of the operations of the elements; an operation sequence setting unit that sets the order of the operations of the elements associated with the same group, based on the set start conditions of the operations of the elements; and a display control unit that controls a display unit to display a field showing the group, for each group, and to display symbols indicating the operations of the elements associated with the groups in the fields, in a manner to show a before and after relationship in accordance with the set order of the operations of the elements.

A second aspect of the present invention is a display method of a display unit that displays an order of operations of a plurality of elements operating during clamp close or open of an injection molding machine, the display method comprising an operation start condition setting step of setting a start condition of the operation for each element; a group setting step of setting the elements operating in conjunction with each other among the plurality of elements to be associated with the same group, based on the set start conditions of the operations of the elements; an operation sequence setting step of setting the order of the operations of the elements associated with the same group, based on the set start conditions of the operations of the elements; and a display control step of controlling a display unit to display a field showing the group, for each group, and to display symbols indicating the operations of the elements associated with the groups in the fields, in a manner to show a before and after relationship in accordance with the set order of the operations of the elements.

According to the present invention, an operator can easily check whether the operations of a plurality of elements are suitably set.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 1 is a block diagram showing a configuration of an injection molding machine and a control device for controlling the injection molding machine;

DESCRIPTION OF THE PREFERRED EMBODIMENTS

First Embodiment

[Configuration of the Injection Molding Machine]

Figure 2A:
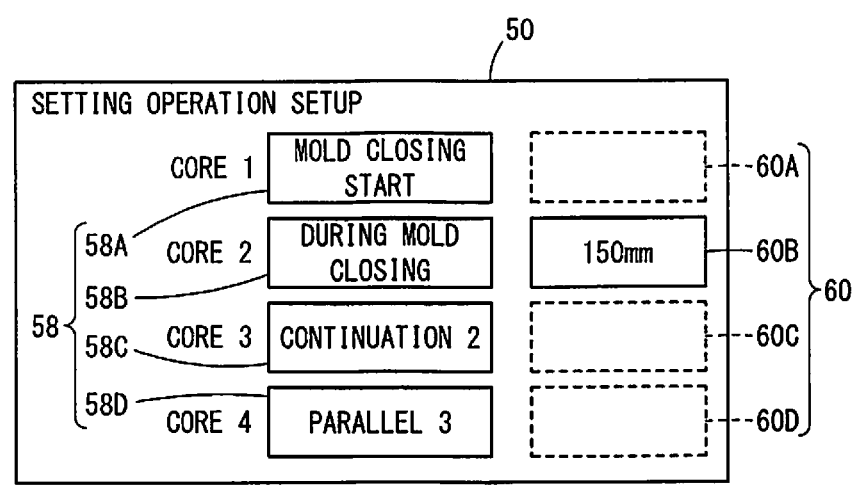
FIG. 2A is a diagram showing a core setting operation setup screen displayed on a display unit.

FIG. 1 is a block diagram showing a configuration of an injection molding machine 10 and a control device 12 for controlling the injection molding machine 10. The injection molding machine 10 has a screw rotation motor 14, an injection motor 16, a mold opening/closing motor 18, an ejector motor 20, a core operation actuator 22, and a peripheral device communication unit 24.

The screw rotation motor 14 is a motor for driving the screw of an injection mechanism in a rotating direction. The injection motor 16 is a motor for driving the screw in the axial direction. As the screw rotates, resin material is moved inside a cylinder toward a nozzle. While back pressure is applied to the screw by the injection motor 16, the screw is rotated by the screw rotation motor 14 to thereby perform a metering operation of supplying a predetermined amount of resin to the front end of the cylinder. Then, the screw is moved toward the nozzle by the injection motor 16 so as to perform an injecting operation of injecting the resin material in the cylinder from the nozzle into the mold. After the mold is filled with the resin material, the screw is kept pressed toward the nozzle by operation of the injection motor 16, thereby performing a pressure holding operation to apply pressure to the resin material until the gate is hardened.

The mold opening/closing motor 18 is a motor for driving a movable platen of a mold clamping mechanism relative to a stationary platen. That is, the movable platen is moved toward the stationary platen by the mold opening/closing motor 18 to thereby close the mold, whereas the movable platen is moved away from the stationary platen to thereby open the mold.

The ejector motor 20 is a motor for driving an ejector pin provided in the movable platen. The ejector pin is driven by the ejector motor 20 to perform an ejector operation for removing the molded article or product from the moving mold half provided on the movable platen. The core operation actuator 22 is a hydraulic cylinder or the like, and is an actuator for performing a core setting operation to set a core to the mold and a core pulling operation to retract the core from the mold.

The peripheral device communication unit 24 communicates with peripheral devices such as a molding unloading device 26 and a vacuum evacuation device 28. The peripheral device communication unit 24 performs a signal output operation of outputting communication signals to the control device 12. The control device 12 transmits communication signals output from the peripheral device communication unit 24 to the molding unloading device 26 and the vacuum evacuation device 28. Further, the control device 12 transmits communication signals output from the molding unloading device 26 and the vacuum evacuation device 28 to the peripheral device communication unit 24. The peripheral device communication unit 24 performs a signal input operation for inputting communication signals sent from the control device 12.

The molding unloading device 26 is a device for performing an unloading operation to unload or take out the molding from the injection molding machine 10. When the mold opening is completed, the injection molding machine 10 transmits a communication signal requesting an unloading operation from the peripheral device communication unit 24 to the control device 12. The communication signal requesting an unloading operation is transmitted from the control device 12 to the molding unloading device 26. Upon receiving the communication signal requesting an unloading operation, the molding unloading device 26 starts an unloading operation of the molded product. As the unloading operation of the molding is completed, the molding unloading device 26 transmits a communication signal notifying the completion of the unloading operation to the control device 12. The communication signal notifying the completion of the unloading operation is forwarded from the control device 12 to the peripheral device communication unit 24.

The vacuum evacuation device 28 is a device for performing a vacuum evacuating operation to evacuate the interior of the mold. When the mold closing is completed, the injection molding machine 10 transmits a communication signal requesting a vacuum evacuating operation from the peripheral device communication unit 24 to the control device 12. The communication signal requesting a vacuum evacuating operation is transmitted from the control device 12 to the vacuum evacuation device 28. Upon receiving the communication signal requesting the vacuum evacuating operation, the vacuum evacuation device 28 opens a valve between a vacuum tank and the mold and starts the vacuum evacuating operation.

As the valve between the vacuum tank and the mold is completely opened, the vacuum evacuation device 28 transmits to the control device 12 a communication signal notifying the completion of opening of the valve. The communication signal notifying completion of opening of the valve is forwarded from the control device 12 to the peripheral device communication unit 24.

[Configuration of Control Device]

The control device 12 includes an operation unit 30, a display unit 32, an operation starting condition setting unit 34, a group setting unit 36, an operation sequence setting unit 38, a displaying order setting unit 40, a drive command generator 42, a display control unit 44, a communication transmitting unit 46. The control device 12 forms a display unit 48.

Figure 2B:
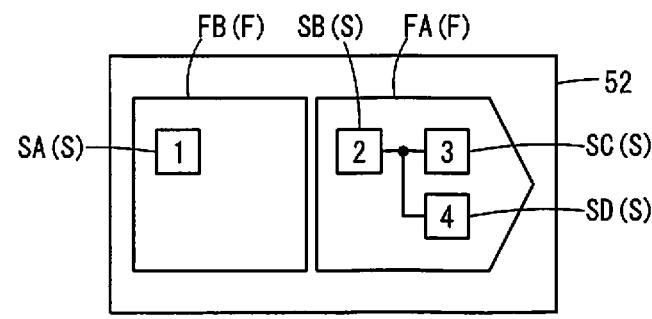
FIG. 2B is a diagram showing a core setting operation confirmation screen displayed on the display unit.
Figure 3A:
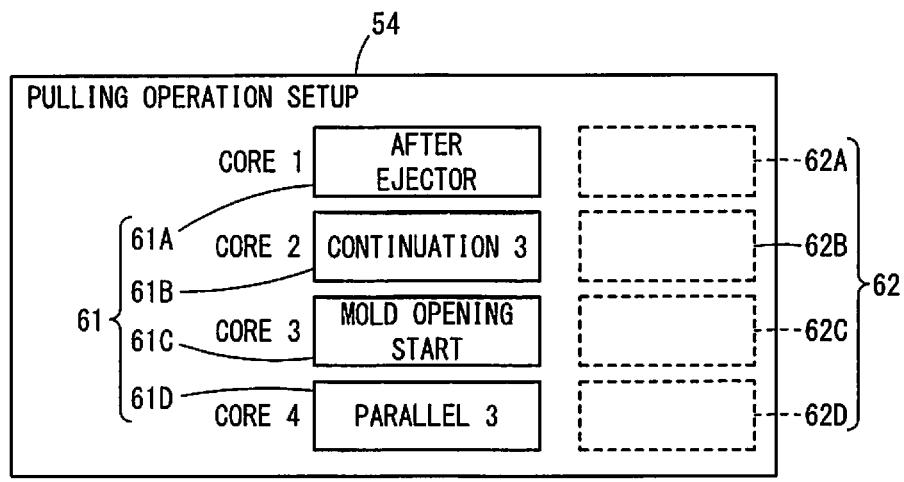
FIG. 3A is a diagram showing a core pulling operation setup screen displayed on a display unit.
Figure 3B:
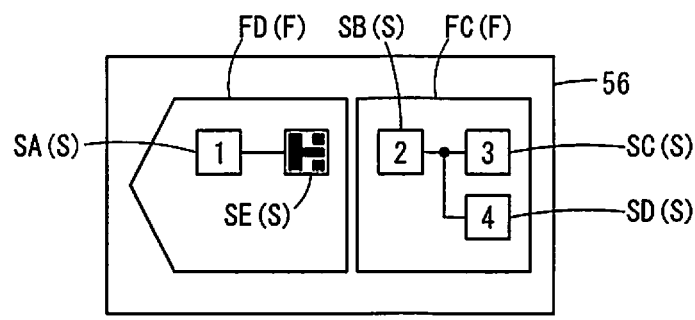
FIG. 3B is a diagram showing a core pulling operation confirmation screen displayed on the display unit.

FIG. 2A is a diagram showing a setup screen 50 for the operator to set conditions for starting core setting operations (hereinafter referred to as a setting operation setup screen 50) displayed on the display unit 32. FIG. 2B is a diagram showing a confirmation screen 52 for confirming the core setting operations (hereinafter referred to as a setting operation confirmation screen 52) displayed on the display unit 32. FIG. 3A is a diagram showing a setup screen 54 for the operator to designate conditions for starting core pulling operations (hereinafter referred to as a pulling operation setup screen 54) displayed on the display unit 32. FIG. 3B is a diagram showing a confirmation screen 56 for confirming the core pulling operations (hereinafter referred to as a pulling operation confirmation screen 56) displayed on the display unit 32.

The operation unit 30 includes a touch panel, a keyboard, a mouse, and the like, and is operating by the operator to thereby input information to the control device 12. The display unit 32 is a liquid crystal display or the like, and displays characters, symbols, drawings and others.

In the control device 12 of the present embodiment, the operator operates the operation unit 30 to designate or set the starting conditions for setting operations and pulling operations for four cores 1 to 4, on the setting operation setup screen 50 and the pulling operation setup screen 54 displayed on the display unit 32, respectively.

The operation starting condition setting unit 34 sets the starting conditions of core setting operations or core pulling operations, in accordance with the operator's input through the operation unit 30. The group setting unit 36, based on the starting conditions set in the operation starting condition setting unit 34, makes settings so as to classify the multiple cores so that cores that operate in conjunction with each other belong to the same group.

The operation sequence setting unit 38, based on the set starting conditions of the core's operations, sets the order of the operations of the cores belonging to the same group. The displaying order setting unit 40 sets the order of displaying multiple fields F each showing a different group on the display unit 32. The display control unit 44 controls the display unit 32 to display the setting operation setup screen 50, the setting operation confirmation screen 52, the pulling operation setup screen 54, the pulling operation confirmation screen 56, and the like.

The drive command generator 42 generates drive commands for driving the screw rotation motor 14, the injection motor 16, the mold opening/closing motor 18, the ejector motor 20 and the core operation actuator 22 of the injection molding machine 10.

The communication transmitting unit 46 transmits communication signals sent from the injection molding machine 10 to the molding unloading device 26 and the vacuum evacuation device 28. Further, the communication transmitting unit 46 transmits the communication signals sent from the molding unloading device 26 and the vacuum evacuation device 28 to the injection molding machine 10.

[Setting Operation Setup Screen]

In the present embodiment, on the setting operation setup screen 50 shown in FIG. 2A, the starting conditions for the setting operations of four cores 1 to 4 are set. Further, on the pulling operation setup screen 54 shown in FIG. 3A, the starting conditions for the pulling operations of the four cores 1 to 4 are set.

The setting operation setup screen 50 is composed of setting operation starting condition selecting sections 58A to 58D and option setting sections 60A to 60D. The operator operates the operation unit 30 to thereby select one of "mold closing start", "during mold closing", "continuation", and "parallel" for each of the setting operation starting condition selecting sections 58A to 58D, whereby the starting conditions of the setting operations for cores 1 to 4 are set.

When "mold closing start" is selected, a core setting operation is started at the same time as the mold starts to be closed. When "during mold closing" is selected, the associated one of option setting sections 60A to 60D is displayed. The operator may enter an arbitrary position of the movable mold into the associated one of the option setting sections 60A to 60D. When "during mold closing" is selected, the movable mold is moved to the position entered into the associated option setting section 60A-60D in the course of closing the mold and the mold closing operation of the mold is stopped, then the core setting operation is started. In FIG. 2A, since "during mold closing" is not selected in the setting operation starting condition selecting sections 58A, 58C and 58D, the option setting sections 60A, 60C and 60D are not displayed.

The operator can select one of "continuation 1", "continuation 2", "continuation 3" and "continuation 4" for "continuation". For example, when "continuation 2" is selected in the setting operation starting condition selecting section 58C, the setting operation of the core 3 is started when the setting operation of the core 2 is completed.

For the "parallel", the operator can select one of "parallel 1", "parallel 2", "parallel 3" and "parallel 4". For example, when "parallel 3" is selected in the setting operation starting condition selecting section 58D, the setting operation of the core 4 is started when the setting operation of the core 3 is started.

The pulling operation setup screen 54 is composed of core pulling operation starting condition selecting sections 61A to 61D and option setting sections 62A to 62D. The operator operates the operation unit 30 to thereby select one of "mold opening start", "during mold opening", "after ejector", "continuation" and "parallel" for each of the pulling operation starting condition selecting sections 61A to 61D, whereby the starting conditions of the pulling operations for cores 1 to 4 are set.

When "mold opening start" is selected, a core pulling operation is started at the same time as the mold starts to be opened. When "during mold opening" is selected, the associated one of option setting sections 62A to 62D is displayed. The operator can enter an arbitrary position of the movable mold into the associated one of the option setting sections 62A to 62D. When the "during mold opening" is selected, the movable mold is moved to the position entered into the associated option setting section 62A-62D in the course of opening the mold and the mold opening operation of the mold is stopped, then the core pulling operation is started. FIG. 3A shows a state where none of the option setting sections 62A to 62D are displayed since the "during mold opening" is not selected in any of the pulling operation starting condition selecting sections 61A to 61D. When "after ejector" is selected, the core pulling operation is started after the ejector operation is completed.

The operator can select one of "continuation 1", "continuation 2", "continuation 3" and "continuation 4" for "continuation". For example, when "continuation 3" is selected in the pulling operation starting condition selecting section 61B, the pulling operation of the core 2 is started when the pulling operation of the core 3 is completed.

The operator can select one of "parallel 1", "parallel 2", "parallel 3" and "parallel 4" for "parallel". For example, when "parallel 3" is selected in the pulling operation starting condition selecting section 61D, the pulling operation of the core 4 is started when the pulling operation of the core 3 is started.

[Setting Operation Confirmation Screen]

When the starting conditions of the core setting operations are set as shown in FIG. 2A, the setting operation confirmation screen 52 is displayed on the display unit 32 as shown in FIG. 2B. In the present embodiment, the group setting unit 36 makes settings so as to classify the cores 1 to 4 so that cores that operate in conjunction with each other belong to the same group. When the starting conditions of the core setting operations are set as in FIG. 2A, the cores 2, 3 and 4 operate in conjunction with each other, whereas the core 1 operates independently from the other cores. In this case, the group setting unit 36 sets the cores 2, 3 and 4 so as to belong to one group 1, and also sets the core 1 so as to belong to another group 2.

On the setting operation confirmation screen 52, as shown in FIG. 2B, a first field FA for the group 1 and a second field FB for the group 2 are shown. In the first field FA, a second symbol SB, a third symbol SC, and a fourth symbol SD respectively indicating operations of the core 2, the core 3 and the core 4 belonging to the group 1 are displayed. In the second field FB, a first symbol SA indicating the operation of the core 1 belonging to the group 2 is displayed. Since the symbols S indicating the operations of cores are displayed on the group fields F, the operator can easily distinguish the cores that operate in conjunction with each other and the core that operates independently.

The operation sequence setting unit 38 sets the order of the setting operations of the cores 2, 3 and 4 belonging to the group 1, in accordance with the conditions for starting the setting operations of the cores 2, 3 and 4. Then, the second symbol SB, the third symbol SC and the fourth symbol SD are displayed in the first field FA according to the thus set order in such a manner as to clarify or visualize the time-sequential relationship.

When the starting conditions of the setting operations are set as shown in FIG. 2A, the core 1 set to "mold closing start" and the core 2 set to "during mold closing" each are a core that is first operated among the cores belonging to each group. In the following, the core that is first operated among the group may be referred to as a leading core. The second symbol SB indicating the operation of the core 2, which is the leading core of the group 1, is displayed in the first field FA, while the first symbol SA indicating the operation of the core 1, which is the leading core of the group 2, is displayed in the second field FB. Then the third symbol SC indicating the operation of the core 3 set to "continuation 2" is displayed on the right side of the second symbol SB. Furthermore, the fourth symbol SD indicating the operation of the core 4 set to "parallel 3" is displayed under the third symbol SC. Also, lines are displayed in the first field FA to connect between the second symbol SB, the third symbol SC and the fourth symbol SD. In FIG. 2B, the passing of time is set from left to right.

Thus, by displaying the symbols S indicating operations of cores in the set time-sequential order in each group field F, it becomes easy for the operator to grasp the order of operations of the cores that operate in conjunction with each other.

The order of displaying the first field FA and the second field FB is set by the displaying order setting unit 40. That is, the displaying order setting unit 40 sets the displaying order of displaying the first field FA and the second field FB, taking into account the starting condition of the setting operation of the core 2 which is the leading core of the group 1 and the starting condition of the setting operation of the core 1 which is the leading core of the group 2.

In FIG. 2A, since the starting condition of the setting operation of the core 1 is set to "mold closing start" and the starting condition of the setting operation of the core 2 is set to "mold closing", the setting operation of the core 1 is started earlier than the setting operation of core 2. In this case, the second field FB is displayed on the left side and the first field FA is displayed on the right side. Further, the second field FB is illustrated as a rectangular shape while the first field FA is illustrated as a pentagon having a triangular protrusion on the right side. Thus, by displaying the group fields F so as to clarify or visualize the time-sequential relationship according to the set order, the operator can roughly grasp the start timing of the core setting operations of the cores belonging to each group. Further, since the first field FA is illustrated as a pentagon having a triangular protrusion on the right side, it is possible to indicate the direction of passing of time, that is, the passing of time is set from left to right in FIG. 2B. It should be noted that the direction of passage of time is not necessarily indicated by the shape of the first field FA but may be indicated using an arrow or the like.

[Pulling Operation Confirmation Screen]

When the starting conditions of the core pulling operations are set as shown in FIG. 3A, the pulling operation confirmation screen 56 is displayed on the display unit 32 as shown in FIG. 3B. The display method of the pulling operation confirmation screen 56 is substantially the same as the display method of the setting operation confirmation screen 52. In the following, the pulling operation confirmation screen 56 will be described focusing on differences from the setting operation confirmation screen 52.

In the present embodiment, the group setting unit 36 makes settings so as to classify the cores 1 to 4 so that cores that operate in conjunction with each other belong to the same group. When the starting conditions of the core pulling operations are set as shown in FIG. 3A, the cores 2, 3 and 4 operate in conjunction with each other, whereas the core 1 operates independently from the other cores. In this case, the group setting unit 36 sets the cores 2, 3 and 4 so as to belong to one group 3, and sets the core 1 so as to belong to another group 4.

On the pulling operation confirmation screen 56, as shown in FIG. 3B, a third field FC for the group 3 and a fourth field FD for the group 4 are shown. In the third field FC, a second symbol SB, a third symbol SC, and a fourth symbol SD respectively indicating operations of the core 2, the core 3 and the core 4 belonging to the group 3 are displayed. In the fourth field FD, a first symbol SA indicating the operation of the core 1 belonging to the group 4 is displayed. It is noted that, since the starting condition of the pulling operation of the core 1 is set to "after ejector", a fifth symbol SE indicating the ejector operation is displayed in FIG. 3B. In this manner, a symbol S indicating an operation of an element other than cores may be displayed.

The operation sequence setting unit 38 sets the order of the pulling operations of the cores 2, 3 and 4 belonging to the group 3, in accordance with the conditions for starting the pulling operations of the cores 2, 3 and 4. Then, the second symbol SB, the third symbol SC and the fourth symbol SD are displayed in the third field FC according to the thus set order in such a manner as to clarify or visualize the time-sequential relationship. Also, lines are displayed in the third field FC to connect between the second symbol SB, the third symbol SC and the fourth symbol SD.

The operation sequence setting unit 38 sets the order of the pulling operation of the core 1 and the ejector operation, in accordance with the starting condition of the pulling operation of the core 1 belonging to the group 4. Then, the first symbol SA and the fifth symbol SE are displayed in the fourth field FD according to the set order in such a manner as to clarify the time-sequential relationship. Also, a line connecting between the first symbol SA and the fifth symbol SE is displayed in the fourth field FD. In FIG. 3B, the passing of time is set from left to right.

The order of displaying the third field FC and the fourth field FD is set by the displaying order setting unit 40. That is, the displaying order setting unit 40 sets the displaying order of displaying the third field FC and the fourth field areas FD, based on the starting condition of the pulling operation of the core 3 which is the leading core of the group 3 and the starting condition of the pulling operation of the core 1 which is the leading core of the group 4.

In FIG. 3A, since the starting condition of the pulling operation of the core 3 is set to "mold opening start" and the starting condition of the pulling operation of the core 1 is set to "after ejector", the pulling operation of the core 3 is started earlier than the pulling operation of the core 1. In this case, the third field FC is displayed on the right side of the fourth field FD. Further, the third field FC is illustrated as a rectangular shape while the fourth field FD is illustrated as a pentagon having a triangular protrusion on the left side. Thus, this illustration makes it possible to indicate the direction of passing of time, that is, time passing from left to right in FIG. 3B. It should be noted that the direction of passage of time is not necessarily indicated by the shape of the fourth field FD but may be indicated using an arrow or the like.

[Drive Command Generation]

Figure 4:
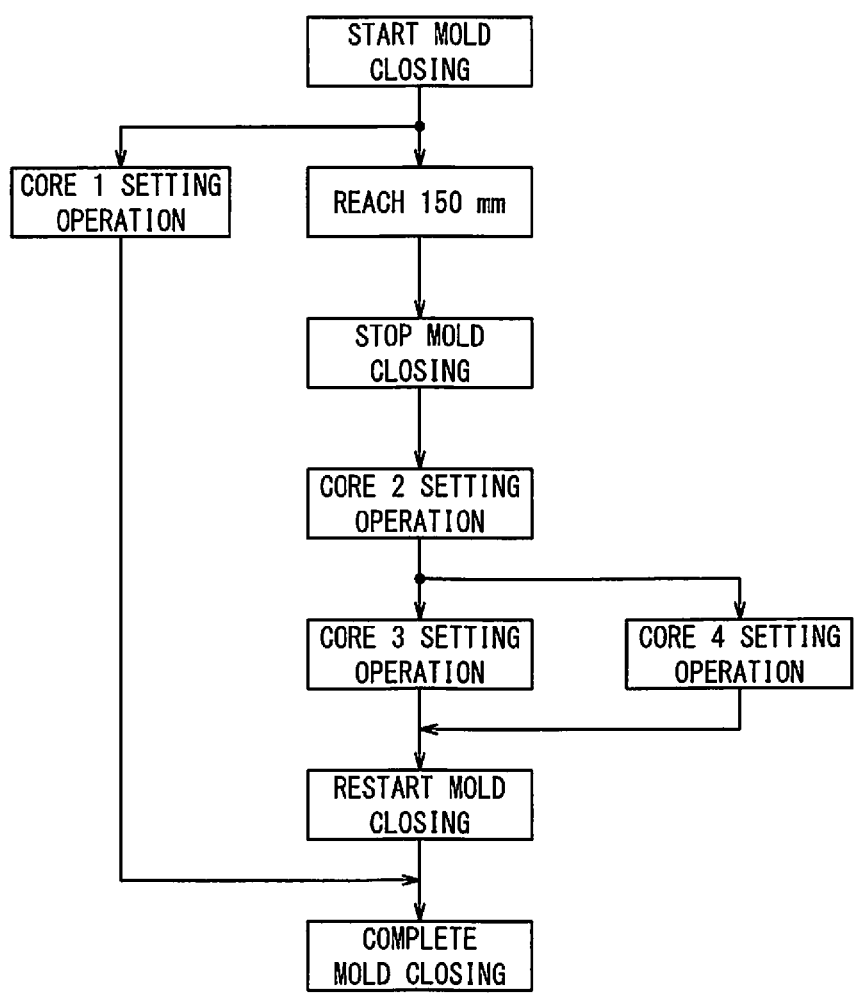
FIG. 4 is a diagram showing an operation flow of mold closing and core setting in accordance with drive commands generated by a drive command generator.

FIG. 4 is a diagram showing a control flow of mold closing and core setting operations based on drive commands generated by the drive command generator 42. FIG. 4 shows an example of the case that the starting conditions of core setting operations are set as shown in FIG. 2A.

When the mold closing operation of the mold is started, the setting operation of the core 1 is started. Since the setting operation of the core 1 is independent of the operations of the other elements, the setting operation of the core 1 is started at an arbitrary time after start of the mold closing operation, and the setting operation of the core 1 is completed before the mold closing operation is completed.

As the mold reaches the position of 150 mm, the mold closing operation is stopped and the setting operation of the core 2 is started. When the setting operation of the core 2 is completed, the setting operation of the core 3 is started. When the setting operation of the core 3 starts, the setting operation of the core 4 is also started. When the setting operations of the core 3 and core 4 are completed, the mold closing operation is restarted, so that the mold closing operation is completed.

Figure 5:
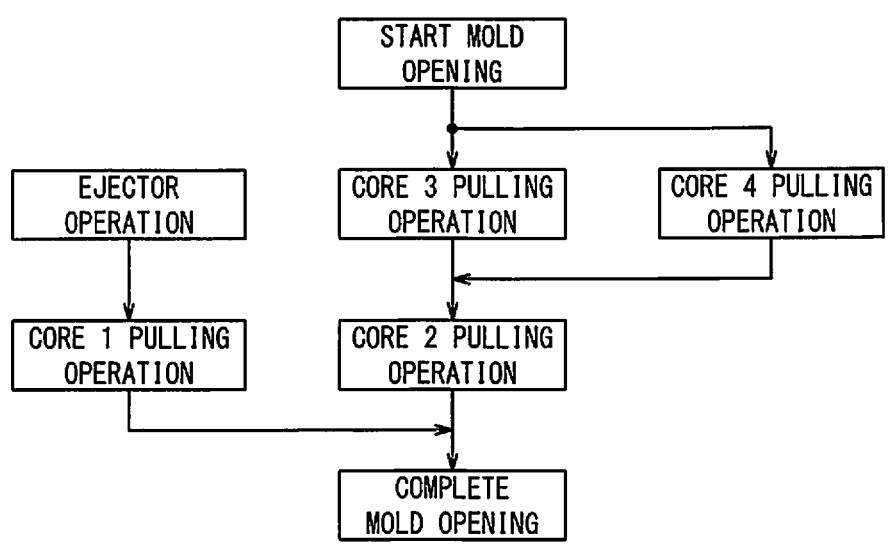
FIG. 5 is a diagram showing an operation flow of mold opening and core pulling in accordance with drive commands generated by a drive command generator.

FIG. 5 is a diagram showing a control flow of mold opening and core pulling operations based on drive commands generated by the drive command generator 42. FIG. 5 shows an example of the case that the starting conditions of core pulling operations are set as shown in FIG. 3A.

When the mold opening operation is started, the core pulling operation of the core 3 is started. When the core pulling operation of the core 3 starts, the core pulling operation of the core 4 is also started. When the core pulling operation of the core 3 is completed, the core pulling operation of the core 2 is started. The pulling operation of the core 2 is completed before the mold opening operation is completed. When the ejector operation is completed, the pulling operation of the core 1 is started. The pulling operation of the core 1 is completed before the mold opening operation is completed.

The operator selects the starting condition in the setting operation starting condition selecting sections 58A to 58D and the pulling operation starting condition selecting sections 61A to 61D to thereby set the starting condition for the operation of one element (a dependent element or a slave element) (second element) that operates in conjunction with the operation of another element (a subject element or a master element) (first element). For example, in the setting operation starting condition selecting section 58C of FIG. 2A, the operator sets the starting condition for the setting operation of the core 3 (a dependent core or a slave core) (second core) that operates in conjunction with the setting operation of the core 2 (a subject core or a master core) (first core).

The drive command generator 42 sets the start timing and the starting order for core operations, based on the starting conditions of the operation of one core (a dependent core or a slave core) (second core) that operates in conjunction with the operation of another core (a subject core or a master core) (first core), and generates drive commands for driving respective elements. In other words, without the need for the operator to specify the start timing and the number in the starting order one by one for each core operation, simply by setting the starting condition of the operation of one core (a dependent core or a slave core) (second core) that operates in conjunction with the operation of another core (a subject core or a master core) (first core), the drive command generator 42 sets the start timing and the starting order of the operation of each core.

[Core Operation Setting Process]

Figure 6:
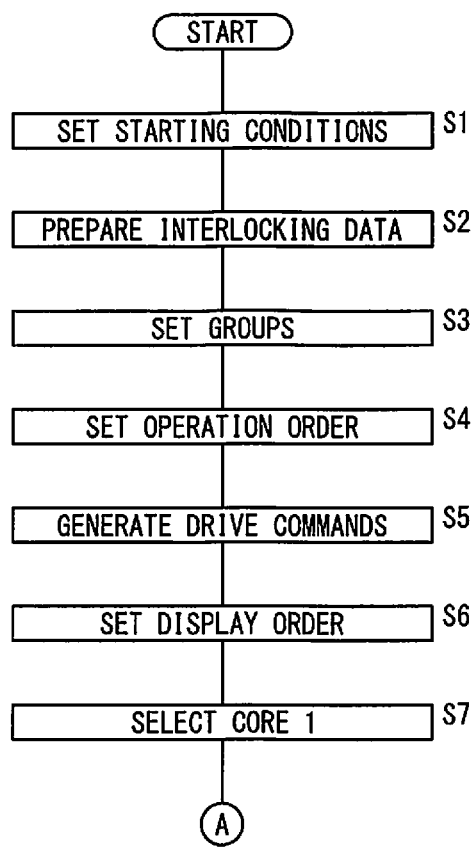
FIG. 6 is a flowchart showing a control flow of setting up core setting operations performed in a control device.
Figure 7:
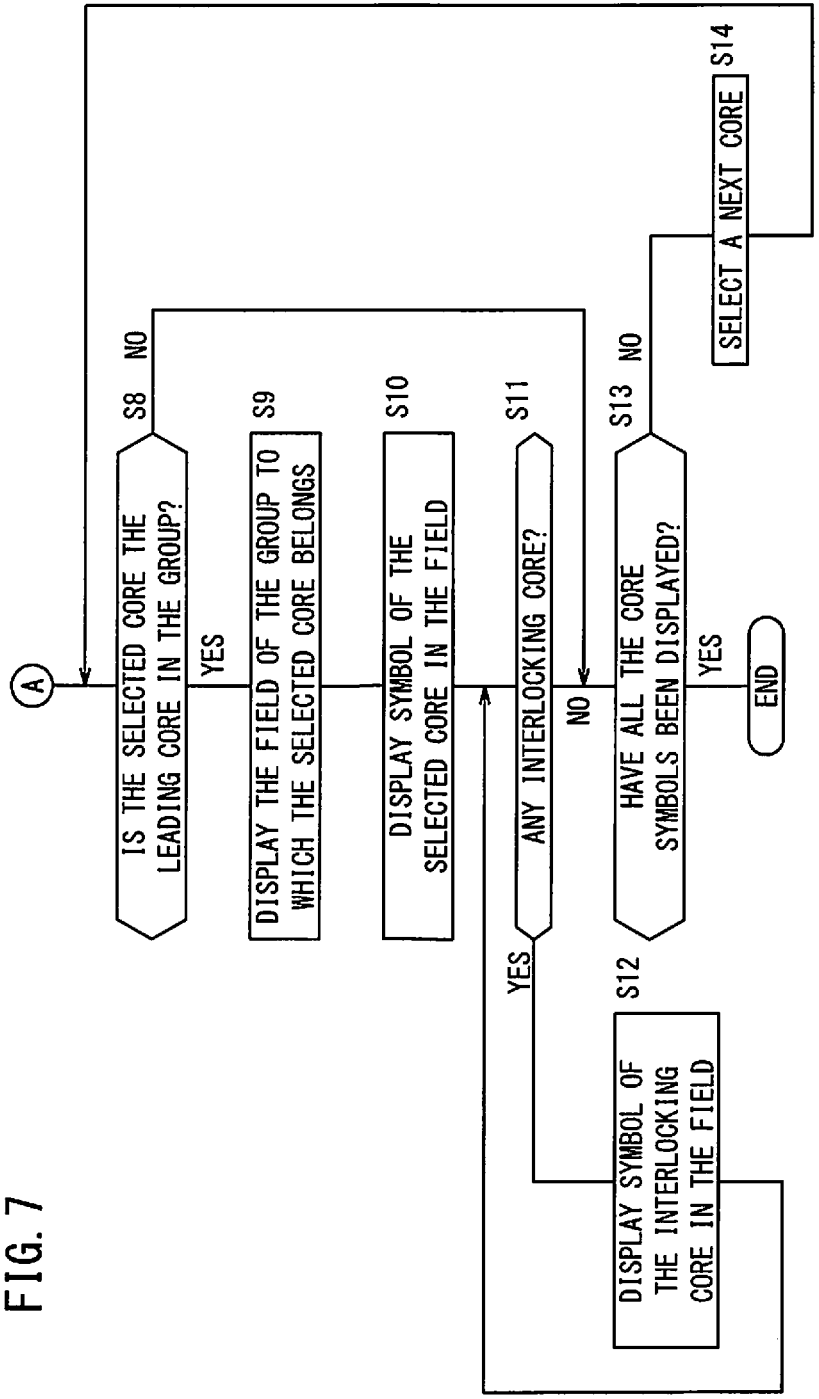
FIG. 7 is a flowchart showing a control flow of setting up core setting operations performed in a control device.

FIGS. 6 and 7 are flowcharts showing a control sequence of setting up core setting operations performed in the control device 12. The following description illustrates a control sequence of core setting operations. The sequence of core pulling operations can also be set similarly.

At step S1, the operation starting condition setting unit 34 sets the starting condition of the setting operation of each core based on the contents selected by the operator in the setting operation starting condition selecting sections 58A to 58D on the setting operation setup screen 50. Then, the control proceeds to step S2.

Figure 8:
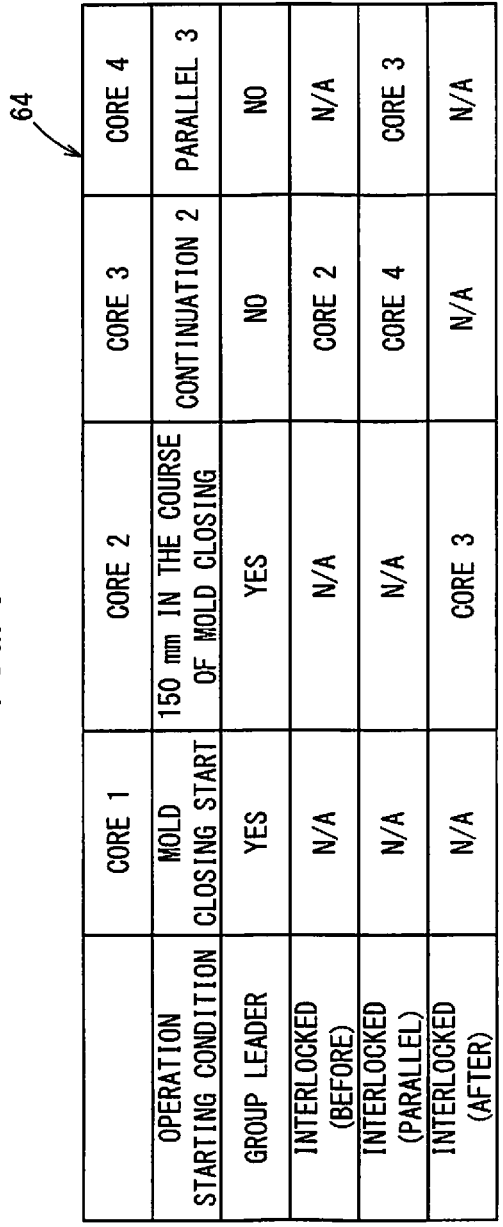
FIG. 8 is a diagram showing interlocking data.

At step S2, the operation starting condition setting unit 34 creates interlocking data 64. The control then proceeds to step S3. FIG. 8 is a diagram showing the interlocking data 64. The group setting unit 36 analyzes the starting condition of each core setting operation and creates the interlocking data 64. The interlocking data 64 includes information on whether or not a core (subject core) is the leader of the group and information on another core interlocking (operated in conjunction) with the core. The information on the other core interlocking with the core may include information on another core whose setting operation is started before the start of the setting operation of the subject core, information on another core whose setting operation is started at the same time with that of the subject core, and information on another core whose setting operation is started after completion of the setting operation of the subject core.

At step S3, the group setting unit 36, based on the interlocking data 64, makes setting so as to classify the cores so that cores that operate in conjunction with each other belong to the same group. Then, the control proceeds to step S4. At step S4, the operation sequence setting unit 38 sets the order of the setting operations of the cores belonging to the same group based on the interlocking data 64, and the control proceeds to step S5.

At step S5, the drive command generator 42 generates drive commands for driving the core operation actuator 22, and the control proceeds to step S6. For the cores belonging to the same group, the drive command generator 42 generates drive commands so that each setting operation can be started in accordance with the order set by the operation sequence setting unit 38. For the cores belonging to different groups, the drive command generator 42 generates drive commands so that the setting operations can be started independently.

At step S6, the displaying order setting unit 40 sets the order in which fields F showing the set groups are displayed on the setting operation confirmation screen 52, and the control proceeds to step S7. The displaying order setting unit 40 sets the order of displaying the fields F on the setting operation confirmation screen 52, based on the starting condition of the setting operation of the leading core among the cores belonging to each group.

At step S7, the core 1 is selected in the display control unit 44, and the control proceeds to step S8. At step S8, it is determined whether or not the selected core is the leading core in the group. If the selected core is the leading core of the group, the control proceeds to step S9, and if the selected core is not the leading one of the group, the control proceeds to step S13.

At step S9, the display control unit 44 controls the display unit 32 so as to display the field F indicating the group to which the selected core belongs, on the setting operation confirmation screen 52, and the control proceeds to step S10. At step S10, the display control unit 44 controls the display unit 32 so as to display a symbol S indicating the operation of the selected core in the displayed field F, and the control proceeds to step S11.

At step S11, the display control unit 44 determines whether or not there is a core operated in conjunction with the selected core, based on the interlocking data 64. If there is a core operated in conjunction with the selected core, the control proceeds to step S12, and if there is no core interlocking with the selected core, the control proceeds to step S13.

At step S12, the display control unit 44 controls the display unit 32 to display a symbol S indicating the operation of the core interlocking with the selected core, in the field F indicating the group to which the selected core belongs, and the control is returned to step S11.

At step S13, the display control unit 44 determines whether or not the symbol S indicating a core operation has been already displayed on the setting operation confirmation screen 52 for all the cores. When the symbol S indicating a core operation has been already displayed for all the cores, the control is terminated. If there is a core for which the symbol S indicating the core operation has not yet been displayed, the control proceeds to step S14. At step S14, a next core is selected, and the control is returned to step S8.

[Operational Effect]

With a mold in which a plurality of cores are installed, in order to avoid damage or the like of the mold, an interlock condition is set whereby the set operation of core 3 must be performed after the set operation of core 2 has been completed, for example. Conventionally, there are devices that display operations of a plurality of cores lined up in time series, but simply by lining up operations of cores in time series it is difficult to judge whether the operations of cores satisfy the interlock conditions.

Therefore, in the present embodiment, cores that operate in conjunction with each other are associated with the same group by the group setting unit 36, based on the start conditions set for the operations of the cores. The operation sequence setting unit 38 then sets the order of the operations of the cores associated with the same group, based on the start conditions set for the operations of the cores. Furthermore, the display control unit 44 displays the fields F showing the groups in the set operation confirmation screen 52 and the pull operation confirmation screen 56, and displays the symbols S indicating the operations of the cores associated with the groups in the fields F in a manner to indicate the before and after relationship according to the set order of the operations of the cores. In this way, it is easy for the operator to understand which cores are operating in conjunction, and it is also easy for the operator to understand the before and after relationship of the operations of the cores operating in conjunction. Accordingly, it is easy for the operator to judge whether the operations of the cores fulfill the interlock conditions.

Furthermore, in the present embodiment, lines forming connections between the symbols S displayed in the same field F are displayed. In this way, it is easy for the operator to confirm that cores with symbols S connected by these lines are operating in conjunction.

Yet further, in the present embodiment, information indicating the passage of time is indicated by the shape of the fields F being displayed. In this way, the operator can confirm the direction of the passage of time in the set operation confirmation screen 52 and the pull operation confirmation screen 56.

Yet further, in the present embodiment, the order in which the fields F showing the groups are displayed is set based on the start times of the operations of the cores operating first in each group, and so the fields F are displayed in a manner to show the before and after relationship according to the set order. In this way, it is easy for the operator to understand the before and after relationship of the operations among cores operating independently.

Second Embodiment

In the first embodiment, the operator sets the starting conditions of core setting operations and the starting conditions of core pulling operations, separately. In the second embodiment, the operator sets only the starting conditions of core setting operations, and the order of the core pulling operations is set up as the reverse order of the core setting operations.

Figure 9A:
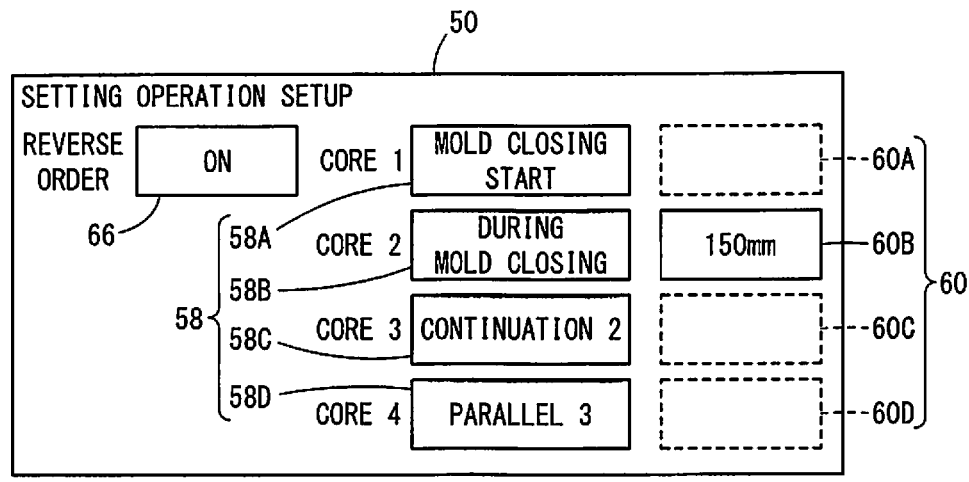
FIG. 9A is a diagram showing a setting operation setup screen displayed on a display unit.
Figure 9B:
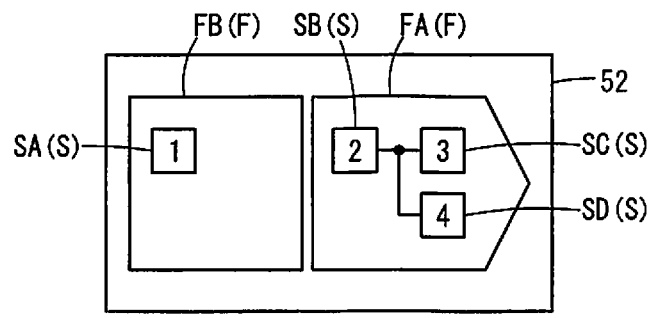
FIG. 9B is a diagram showing a setting operation confirmation screen displayed on a display unit.
Figure 9C:
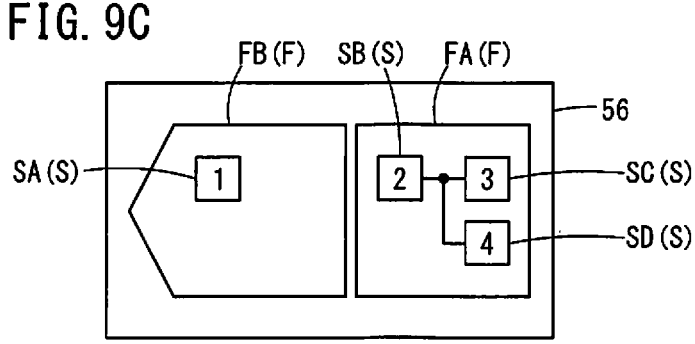
FIG. 9C is a diagram showing a pulling operation confirmation screen displayed on a display unit.

FIG. 9A is a diagram showing a setting operation setup screen 50 displayed on the display unit 32. FIG. 9B is a diagram showing a setting operation confirmation screen 52 displayed on the display unit 32. FIG. 9C is a diagram showing a pulling operation confirmation screen 56 displayed on the display unit 32.

The setting operation setup screen 50 (FIG. 9A) of the present embodiment has a reverse order selecting section 66 added to the setting operation setup screen 50 (FIG. 2A) of the first embodiment. The operator can select "ON" or "OFF" in the reverse order selecting section 66 by operating the operation unit 30.

When "ON" is selected in the reverse order selecting section 66, the setting operation confirmation screen 52 shown in FIG. 9B is displayed on the display unit 32 in the same manner as in the first embodiment. In this embodiment, the pulling operation confirmation screen 56 shown in FIG. 9C is further displayed on the display unit 32. On the pulling operation confirmation screen 56, the fields F indicating different groups and the symbols S indicating core operations are displayed in reverse order of the sequential order shown in the setting operation confirmation screen 52.

Figure 10:
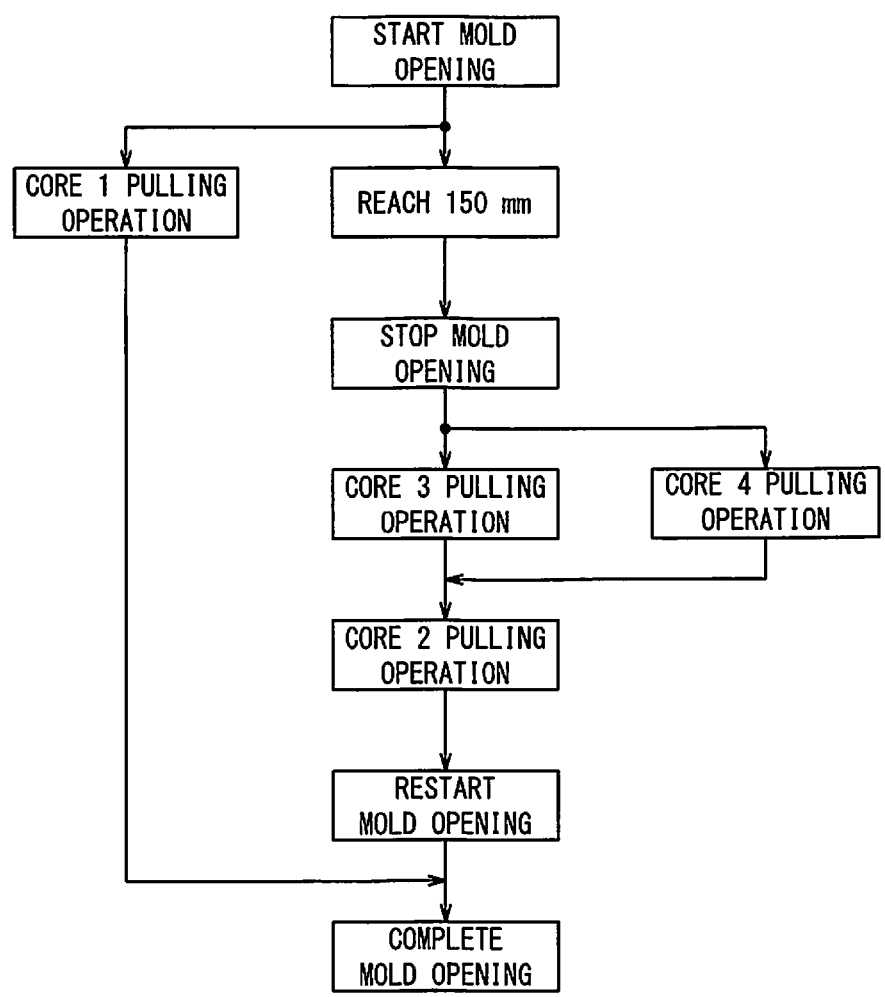
FIG. 10 is a diagram showing a control flow of mold opening and core pulling operations in accordance with drive commands generated by a drive command generator.

FIG. 10 is a diagram showing a control flow of mold opening and core pulling operations based on drive commands generated by the drive command generator 42. When "ON" is selected in the reverse order selecting section 66, the control flow of mold closing and core setting operations based on the drive commands generated by the drive command generator 42 is similar to that in the first embodiment, as shown in FIG. 4. When "ON" is selected in the reverse order selecting section 66, the control flow of mold opening and core pulling operations based on the drive commands generated by the drive command generator 42 is implemented in reverse order of FIG. 4, as shown in FIG. 10.

It should be noted that the reverse order selecting section 66 may be provided on the pulling operation setup screen 54 so as to display the setting operation confirmation screen 52 and generate drive commands of core setting operations, based on the starting conditions of core pulling operations set through the pulling operation setup screen 54.

[Operation and Effect]

In the present embodiment, when the starting conditions of core setting operations are set on the setting operation setup screen 50, the order of core pulling operations is reversed with respect to the order of the core setting operations. As a result, the operator can set the order of pulling operations merely by setting the starting conditions of the core setting operations on the setting operation setup screen 50.

[Modifications]

In the first embodiment, the starting condition of the setting operation of a core (a dependent core or a slave core) that operates in conjunction with the setting operation of another core (a subject core or a master core) is set on the setting operation setup screen 50. Similarly, the starting condition of the pulling operation of a core (a dependent core) that operates in conjunction with the pulling operation of another core (a subject core) is set on the pulling operation setup screen 54.

The setting operation or the core pulling operation of the subject core may be replaced by any one of a mold closing operation for closing the mold, a mold opening operation for opening the mold, an ejector operation for ejecting the molded article from the mold, an unloading operation for taking out the molded article from the injection molding machine 10, and a signal output operation for outputting a communication signal from the injection molding machine 10 to the control device 12.

The setting operation or the pulling operation of the dependent core may be replaced by any one of a mold closing operation for closing the mold, a mold opening operation for opening the mold, an ejector operation for ejecting the molded article from the mold, a cycle start operation which is the first operation to be performed in a molding cycle of the injection molding machine 10, an injecting operation of injecting the resin into the mold, a pressure holding operation of applying pressure to the resin material until the gate is hardened after filling the mold with the resin material, a metering operation for measuring the amount of resin material to fill the mold, and a signal input operation for inputting a communication signal from the control device 12 to the injection molding machine 10. Note that the cycle start operation is usually a mold closing operation, but may be another operation such as placing a sheet in the mold.

Technical Concepts Obtained from the Embodiments

The following is a record of the technical concepts that can be understood from the embodiments described above.

A display unit (48) of an injection molding machine (10) that displays an order of operations of a plurality of elements operating during clamp close or open of the injection molding machine (10), the display unit comprising an operation start condition setting unit (34) that sets a start condition of the operation for each element; a group setting unit (36) that sets the elements operating in conjunction with each other among the plurality of elements to be associated with the same group, based on the set start conditions of the operations of the elements; an operation sequence setting unit (38) that sets the order of the operations of the elements associated with the same group, based on the set start conditions of the operations of the elements; and a display control unit (44) that controls a display unit (32) to display a field (F) showing the group, for each group, and to display symbols (S) indicating the operations of the elements associated with the groups in the fields (F), in a manner to show a before and after relationship in accordance with the set order of the operations of the elements. In this way, it is easy for the operator to judge whether the operations of the elements satisfy an interlock condition.

In the display unit (48) of the injection molding machine (10) described above, the display control unit (44) may control the display unit (32) to display lines providing connections between the symbols indicating the operations of elements that are displayed in the same field. In this way, it is easy for the operator to confirm that the elements of the symbols (S) joined by the lines are operating in conjunction with each other.

In the display unit (48) of the injection molding machine (10) described above, the display control unit (44) may control the display unit (32) to display information indicating a direction of the passage of time. In this way, the operator can confirm the direction of the passage of time in the display unit (32).

The display unit (48) of the injection molding machine (10) described above may comprise a display order setting unit (40) that sets an order in which the fields showing the groups are displayed, based on start times of the operations of the elements that operate first in the groups, and the display control unit (44) may cause the display unit (32) to display the fields (F) showing the groups in a manner to show a before and after relationship according to the set order in which the fields are displayed. In this way, it is easy for the operator to also understand the before and after relationship between the operations of elements operating independently from each other.

In the display unit (48) of the injection molding machine (10) described above, the operation start condition setting unit (34), for at least a portion of the elements among the plurality of elements, may set the start condition of another of the elements operating in conjunction with the operation of one of the elements, and the operation of the one element may be any one of a mold core operation, a mold closing operation, a mold opening operation, an ejector operation, a molded article unloading operation, and a signal output operation for outputting a signal from the injection molding machine (10) to peripheral devices (26 and 28) of the injection molding machine (10). In this way, it is easy for the operator to judge whether the operations of the elements satisfy an interlock condition.

In the display unit (48) of the injection molding machine (10) described above, the operation start condition setting unit (34), for at least a portion of the elements among the plurality of elements, may set the start condition of another of the elements operating in conjunction with the operation of one element, and the operation of the other element may be any one of a mold core operation, a mold closing operation, a mold opening operation, an ejector operation, a molding cycle start operation, an injection operation, a pressure holding operation, a measurement operation, and a signal input operation for inputting a signal from a peripheral device (26 or 28) of the injection molding machine (10) to the injection molding machine (10). In this way, it is easy for the operator to judge whether the operations of the elements satisfy an interlock condition.

In the display unit (48) of the injection molding machine (10) described above, the operation start condition setting unit (34), for at least a portion of the elements among the plurality of elements, may set the start condition of another of the elements operating in conjunction with the operation of one element, and the operation of the one element may be a set operation for installing one core inside a mold, and the operation of the other element may be a set operation for installing another core inside a mold, or the operation of the one element may be a pull operation for returning the installation of the one core from the mold, and the operation of the other element may be a pull operation for returning the installation of the other core from the mold. In this way, it is easy for the operator to judge whether the operations of the elements satisfy an interlock condition.

In the display unit (48) of the injection molding machine (10) described above, when the start condition of the other core operating in conjunction with the set operation of the one core is set, the operation sequence setting unit (38) may set the order of the pull operation of the one core and the pull operation of the other core to be the opposite of the order of the set operation of the one core and the set operation of the other core. In this way, the operator can set the order of the pull operations of the cores just by setting the start conditions for the set operations of the cores.

A display method of a display unit (48) that displays an order of operations of a plurality of elements operating during clamp close or open of an injection molding machine (10), the display method comprising an operation start condition setting step of setting a start condition of the operation for each element; a group setting step of setting the elements operating in conjunction with each other among the plurality of elements to be associated with the same group, based on the set start conditions of the operations of the elements; an operation sequence setting step of setting the order of the operations of the elements associated with the same group, based on the set start conditions of the operations of the elements; and a display control step of controlling a display unit (32) to display a field (F) showing the group, for each group, and to display symbols (S) indicating the operations of the elements associated with the groups in the fields (F), in a manner to show a before and after relationship in accordance with the set order of the operations of the elements. In this way, the operator can set the order of the pull operations of the cores just by setting the start conditions for the set operations of the cores in the set operation setup screen (50).

In the display method of the display unit (48) described above, the display control step may include controlling the display unit (32) to display lines providing connections between the symbols indicating the operations of elements that are displayed in the same field. In this way, it is easy for the operator to confirm that the elements of the symbols (S) joined by the lines are operating in conjunction with each other.

In the display method of the display unit (48) described above, the display control step may include controlling the display unit (32) to display information indicating a direction of the passage of time. In this way, the operator can confirm the direction of the passage of time in the display unit (32).

The display method of the display unit (48) described above may comprise a display order setting step of displaying an order in which the fields showing the groups are displayed, based on start times of the operations of the elements that operate first in the groups, and the display control step may include causing the display unit (32) to display the fields showing the groups in a manner to show a before and after relationship according to the set order in which the fields are displayed. In this way, it is easy for the operator to also understand the before and after relationship between the operations of elements operating independently from each other.

In the display method of the display unit (48) described above, the operation start condition setting step may include, for at least a portion of the elements among the plurality of elements, setting the start condition of another of the elements operating in conjunction with the operation of one of the elements, and the operation of the one element may be any one of a mold core operation, a mold closing operation, a mold opening operation, an ejector operation, a molded article unloading operation, and a signal output operation for outputting a signal from the injection molding machine (10) to peripheral devices (26 and 28) of the injection molding machine (10). In this way, it is easy for the operator to judge whether the operations of the elements satisfy an interlock condition.

In the display method of the display unit (48) for an injection molding machine (10) described above, the operation start condition setting step may include, for at least a portion of the elements among the plurality of elements, setting the start condition of another of the elements operating in conjunction with the operation of one element, and the operation of the other element may be any one of a mold core operation, a mold closing operation, a mold opening operation, an ejector operation, a molding cycle start operation, an injection operation, a pressure holding operation, a measurement operation, and a signal input operation for inputting a signal from a peripheral device (26 or 28) of the injection molding machine (10) to the injection molding machine (10). In this way, it is easy for the operator to judge whether the operations of the elements satisfy an interlock condition.

In the display method of the display unit (48) described above, the operation start condition setting step may include, for at least a portion of the elements among the plurality of elements, setting the start condition of another of the elements operating in conjunction with the operation of one element, and the operation of the one element may be a set operation for installing one core inside a mold, and the operation of the other element may be a set operation for installing another core inside a mold, or the operation of the one element may be a pull operation for returning the installation of the one core from the mold, and the operation of the other element may be a pull operation for returning the installation of the other core from the mold. In this way, it is easy for the operator to judge whether the operations of the elements satisfy an interlock condition.

Although certain preferred embodiments of the present invention have been shown and described in detail, it should be understood that various changes and modifications may be made therein without departing from the scope of the appended claims.

What is claimed is:

1. A control device of an injection molding machine that displays an order of operations of a plurality of elements operating during clamp close or open of the injection molding machine, the control device configured to:
   set, with respect to a plurality of elements operating during either one of the clamp close or open, an operation start condition for each element;
   associate one element and another element that operates in conjunction with an operation of said one element with one group and associate still another element that does not operate in conjunction with the operation of the one element with another group, based on the set operation start condition for each of the elements;
   set an order of operations of the one element and the another element of the plurality of elements associated with the one group, based on the set operation start conditions for the one and another elements; and
   control a display unit to display a field showing the one group and another field showing the another group and to display a symbol indicating an operation of said one element and a symbol indicating an operation of said another element in the field showing the one group in a manner of being related to each other in accordance with the set order of the operations of the one element and the another element of the plurality of elements, and also to display a symbol indicating an operation of said still another element in the another field showing said another group.

2. The control device of the injection molding machine according to claim 1, wherein the control device is further configured to control the display unit to display lines providing connections between the symbol indicating the operation of the one element and the symbol indicating the operation of the another element that are displayed in the field indicating the one group.

3. The control device of the injection molding machine according to claim 1, wherein the control device is further configured to control the display unit to display information indicating a direction of a passage of time.

4. The control device of the injection molding machine according to claim 1, wherein the control device is further configured to:
display an order in which the field showing the one group and the another field showing the another group are displayed, based on start times of the operations of the plurality of elements that operate first in each group; and
control the display unit to display the fields field showing the one group and the another field showing the another group in a manner to show a before-and-after relationship according to the order in which the field showing the one group and the another field showing the another group are displayed.

5. The control device of the injection molding machine according to claim 1, wherein
the operation of the one element is any one of an operation of a core of a mold, a mold closing operation, a mold opening operation, an ejector operation, a molded article unloading operation, and a signal output operation for outputting a signal from the injection molding machine to peripheral devices of the injection molding machine.

6. The control device of the injection molding machine according to claim 1, wherein
the operation of the another element is any one of an operation of a core of a mold, a mold closing operation, a mold opening operation, an ejector operation, a molding cycle start operation, an injection operation, a pressure holding operation, a measurement operation, and a signal input operation for inputting a signal from a peripheral device of the injection molding machine to the injection molding machine.

7. The control device of the injection molding machine according to claim 1, wherein
the operation of the one element is a set operation for installing a first core inside a mold, and the operation of the another element is a set operation for installing a second core inside a mold, or
the operation of the one element is a pull operation for returning the installation of the first core from the mold, and the operation of the another element is a pull operation for returning the installation of the second core from the mold.

8. The control device of the injection molding machine according to claim 7, wherein
when an operation start condition for a set operation of the first core and an operation start condition for a set operation of the second core that operates in conjunction with the set operation of the first core are set, the control device is further configured to set an order of the pull operation of the first core and the pull operation of the second core to be the opposite of an order of the set operation of the first core and the set operation of the second core.

9. A display method of a control device that displays an order of operations of a plurality of elements operating during clamp close of clamp open of an injection molding machine, the display method comprising:
setting, with respect to a plurality of elements operating during either one of the clamp close or open, an operation condition for each element;
associating one element and another element that operates in conjunction with an operation of the one element with one group and associate still another element that does not operate in conjunction with the operation of the one element with another group, based on the set operation start condition for each of the elements;
setting an order of operations of the one element and the another element of the plurality of elements associated with the one group, based on the set operation start conditions for the one and another elements; and
controlling a display unit to display a field showing the one group and another field showing the another group and to display a symbol indicating an operation of the one element and a symbol indicating an operation of the another element in the field showing the one group in a manner of being related to each other in accordance with the set order of the operations of the one element and the another element of the plurality of elements, and also to display a symbol indicating an operation of the still another element in the another field showing the another group.

10. The display method of the control device according to claim 9, further comprising controlling the display unit to display lines providing connections between the symbol indicating the operation of the one element and the symbol indicating the operation of the another element that are displayed in the field indicating the one group.

11. The display method of the control device according to claim 9, further comprising controlling the display unit to display information indicating a direction of a passage of time.

12. The display method of the control device according to claim 9, comprising:
displaying an order in which the field showing the one group and the another field showing the another group are displayed, based on start times of the operations of the plurality of elements that operate first in each group; and
controlling the display unit to display the field showing the one group and the another field showing the another group in a manner to show a before-and-after relationship according to the order in which the field showing the one group and the another field showing the another group are displayed.

13. The display method of the control device according to claim 9, wherein
the operation of the one element is any one of an operation of a core of a mold, a mold closing operation, a mold opening operation, an ejector operation, a molded article unloading operation, and a signal output operation for outputting a signal from the injection molding machine to peripheral devices of the injection molding machine.

14. The display method of the control device according to claim 9, wherein
the operation of the another element is any one of an operation of a core of a mold, a mold closing operation, a mold opening operation, an ejector operation, a molding cycle start operation, an injection operation, a pressure holding operation, a measurement operation, and a signal input operation for inputting a signal from a peripheral device of the injection molding machine to the injection molding machine.

15. The display method of the control device according to claim 9, wherein the operation of the one element is a set operation for installing a first core inside a mold, and the operation of the another element is a set operation for installing a second core inside a mold, or the operation of the one element is a pull operation for returning the installation of the first core from the mold, and the operation of the another element is a pull operation for returning the installation of the second core from the mold.

\* \* \* \* \*